US008840318B2

(12) United States Patent
Baca et al.

(10) Patent No.: US 8,840,318 B2
(45) Date of Patent: Sep. 23, 2014

(54) FERRULE WITH STRESS-ISOLATION FEATURE

(71) Applicant: Corning Cable Systems LLC, Hickory, NC (US)

(72) Inventors: Adra Smith Baca, Rochester, NY (US); Thomas Dale Ketcham, Horseheads, NY (US); Robert Michael Morena, Lindley, NY (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 13/795,979

(22) Filed: Mar. 12, 2013

(65) Prior Publication Data
US 2014/0105547 A1    Apr. 17, 2014

Related U.S. Application Data

(60) Provisional application No. 61/713,805, filed on Oct. 15, 2012.

(51) Int. Cl.
*G02B 6/36* (2006.01)
*G02B 6/38* (2006.01)

(52) U.S. Cl.
CPC .............. *G02B 6/36* (2013.01); *G02B 6/3854* (2013.01)
USPC ................................ 385/62; 385/72; 385/81

(58) Field of Classification Search
CPC .... G02B 6/381; G02B 6/3833; G02B 6/3834; G02B 6/3845; G02B 6/3854; G02B 6/3859; G02B 6/3862
USPC ..................... 385/62, 81, 60, 72, 78
See application file for complete search history.

(56) References Cited

U.S. PATENT DOCUMENTS

| 4,147,402 | A | | 4/1979 | Chown ........................ 350/96.18 |
|---|---|---|---|---|
| 4,345,930 | A | | 8/1982 | Basola et al. .................... 65/102 |
| 4,352,542 | A | * | 10/1982 | Tydings .......................... 385/70 |
| 4,510,005 | A | | 4/1985 | Nijman .......................... 156/221 |
| 4,678,268 | A | | 7/1987 | Russo et al. ................ 350/96.18 |
| 4,859,827 | A | | 8/1989 | Coyle, Jr. et al. ......... 219/121.64 |
| 4,932,989 | A | | 6/1990 | Presby .............................. 65/2 |
| 5,011,254 | A | | 4/1991 | Edwards et al. ............ 350/96.18 |

(Continued)

FOREIGN PATENT DOCUMENTS

| JP | 2001174668 A | * | 6/2001 |
|---|---|---|---|
| JP | 2002169056 A | * | 6/2002 |

(Continued)

OTHER PUBLICATIONS

Patent Cooperation Treaty, International Search Report and Written Opinion for International Application No. PCT/US2013/064000; Mailing Date Jan. 17, 2014—6 pages.

*Primary Examiner* — Charlie Peng (57) ABSTRACT

A ferrule for optical waveguides includes an exterior of the ferrule, an interior of the ferrule, and a stress-isolation region between the interior of the ferrule and the exterior of the ferrule. The interior of the ferrule has a bore defined therein that is configured to receive an optical waveguide. The material of the stress-isolation region has an elastic modulus that is less than the elastic modulus of material of the interior and exterior of the ferrule, whereby the stress-isolation region limits communication of stresses therebetween.

17 Claims, 8 Drawing Sheets

(56) References Cited

U.S. PATENT DOCUMENTS

| | | | |
|---|---|---|---|
| 5,042,895 A | 8/1991 | Chouinard et al. | 385/2 |
| 5,101,090 A | 3/1992 | Coyle, Jr. et al. | 219/121.68 |
| 5,226,101 A | 7/1993 | Szentesi et al. | 385/85 |
| 5,256,851 A | 10/1993 | Presby | 219/121.69 |
| 5,291,570 A | 3/1994 | Filgas et al. | 385/78 |
| 5,317,661 A | 5/1994 | Szentesi et al. | 385/31 |
| 5,421,928 A | 6/1995 | Knecht et al. | 156/153 |
| 5,772,720 A | 6/1998 | Taira-Griffin et al. | 65/387 |
| 5,954,974 A | 9/1999 | Broer et al. | 216/2 |
| 5,966,485 A | 10/1999 | Luther et al. | 385/85 |
| 6,139,196 A | 10/2000 | Feth et al. | 385/97 |
| 6,246,026 B1 | 6/2001 | Vergeest | 219/121.72 |
| 6,276,842 B1 * | 8/2001 | Xu et al. | 385/85 |
| 6,282,349 B1 | 8/2001 | Griffin | 385/81 |
| 6,361,219 B1 | 3/2002 | Blyler, Jr. et al. | 385/85 |
| 6,413,450 B1 | 7/2002 | Mays, Jr. | 264/1.27 |
| 6,509,547 B1 | 1/2003 | Bernstein et al. | 219/121.68 |
| 6,534,741 B2 | 3/2003 | Presby | 219/121.69 |
| 6,738,544 B2 | 5/2004 | Culbert et al. | 385/33 |
| 6,742,936 B1 | 6/2004 | Knecht et al. | 385/67 |
| 6,774,341 B2 | 8/2004 | Ohta | 219/121.72 |
| 6,805,491 B2 | 10/2004 | Durrant et al. | 385/76 |
| 6,817,785 B2 | 11/2004 | Tian | 385/96 |
| 6,822,190 B2 | 11/2004 | Smithson et al. | 219/121.69 |
| 6,825,440 B2 | 11/2004 | Ohta et al. | 219/121.69 |
| 6,886,991 B2 | 5/2005 | Endo | 385/78 |
| 6,888,987 B2 | 5/2005 | Sercel et al. | 385/39 |
| 6,902,327 B1 | 6/2005 | Johnson | 385/60 |
| 6,939,055 B2 | 9/2005 | Durrant et al. | 385/76 |
| 6,951,994 B2 | 10/2005 | Mays, Jr. | 219/121.67 |
| 6,955,478 B2 | 10/2005 | Durrant et al. | 385/85 |
| 6,957,920 B2 | 10/2005 | Luther et al. | 385/85 |
| 6,960,627 B2 | 11/2005 | Huth et al. | 525/59 |
| 6,963,687 B2 | 11/2005 | Vergeest et al. | 385/123 |
| 6,968,103 B1 | 11/2005 | Schroll et al. | 385/30 |
| 7,023,001 B2 | 4/2006 | Cournoyer et al. | 250/492.1 |
| 7,029,187 B2 | 4/2006 | Chapman et al. | 385/96 |
| 7,082,250 B2 | 7/2006 | Jones et al. | 385/134 |
| 7,142,741 B2 | 11/2006 | Osborne | 385/15 |
| 7,147,384 B2 | 12/2006 | Hardcastle et al. | 385/60 |
| 7,216,512 B2 | 5/2007 | Danley et al. | 65/392 |
| 7,264,403 B1 | 9/2007 | Danley et al. | 385/60 |
| 7,267,491 B2 | 9/2007 | Luther et al. | 385/85 |
| 7,306,376 B2 | 12/2007 | Scerbak et al. | 385/76 |
| 7,324,723 B2 | 1/2008 | Shioda et al. | 385/31 |
| 7,324,724 B2 | 1/2008 | Levesque et al. | 385/31 |
| 7,377,700 B2 | 5/2008 | Manning et al. | 385/72 |
| 7,419,308 B2 | 9/2008 | Ma | 385/54 |
| 7,509,004 B2 | 3/2009 | Coleman | 385/33 |
| 7,540,668 B2 | 6/2009 | Brown | 385/78 |
| 7,630,609 B1 | 12/2009 | Mays, Jr. et al. | 385/137 |
| 7,695,201 B2 | 4/2010 | Douglas et al. | 385/85 |
| 7,802,927 B2 | 9/2010 | Benjamin et al. | 385/88 |
| 8,052,836 B2 | 11/2011 | Cale et al. | 156/712 |
| 8,101,885 B2 | 1/2012 | Nakamae et al. | 219/121.77 |
| 8,104,974 B1 | 1/2012 | Gurreri | 385/72 |
| 8,109,679 B2 | 2/2012 | Danley et al. | 385/85 |
| 8,132,971 B2 | 3/2012 | Luther et al. | 385/83 |
| 2002/0172471 A1 * | 11/2002 | Slater et al. | 385/78 |
| 2003/0077042 A1 * | 4/2003 | Okuma et al. | 385/60 |
| 2003/0190135 A1 | 10/2003 | Moidu et al. | 385/138 |
| 2004/0234211 A1 | 11/2004 | Durrant et al. | 385/88 |
| 2005/0008307 A1 | 1/2005 | Culbert et al. | 385/123 |
| 2005/0284852 A1 | 12/2005 | Vergeest et al. | 219/121.67 |
| 2006/0137403 A1 | 6/2006 | Barr et al. | 65/377 |
| 2006/0266743 A1 | 11/2006 | Chi et al. | 219/121.69 |
| 2008/0067158 A1 | 3/2008 | Levesque | 219/121.72 |
| 2010/0101277 A1 | 4/2010 | Gonthier et al. | 65/392 |
| 2010/0215319 A1 | 8/2010 | Childers et al. | 385/60 |
| 2010/0303416 A1 | 12/2010 | Danley et al. | 385/55 |
| 2011/0038583 A1 * | 2/2011 | Kojima et al. | 385/78 |
| 2012/0014649 A1 | 1/2012 | Duis et al. | 385/65 |
| 2012/0027356 A1 | 2/2012 | Gurreri | 385/60 |
| 2012/0027358 A1 | 2/2012 | Webb et al. | 385/78 |
| 2014/0105545 A1 * | 4/2014 | Danley et al. | 385/78 |
| 2014/0105546 A1 * | 4/2014 | Baca et al. | 385/78 |

FOREIGN PATENT DOCUMENTS

| | | | | |
|---|---|---|---|---|
| WO | 01/61394 A1 | 8/2001 | | G02B 6/26 |
| WO | 01/61395 A1 | 8/2001 | | G02B 6/26 |
| WO | 01/61870 A2 | 8/2001 | | |
| WO | 2004/003612 A1 | 1/2004 | | G02B 6/25 |
| WO | 2008/103239 A1 | 8/2008 | | B23K 26/00 |

* cited by examiner

FIG. 13

FERRULE WITH STRESS-ISOLATION FEATURE

RELATED APPLICATIONS

This application claims the benefit of priority under 35 U.S.C. §119 of U.S. Provisional Application Ser. No. 61/713,805 filed on Oct. 15, 2012, the content of which is relied upon and incorporated herein by reference in its entirety.

BACKGROUND

Aspects of the present disclosure relate generally to a ferrule system for a fiber optic connector, and methods of manufacturing and using the same.

Typical practice for manufacture of optical fibers attached to hardened ferrules includes attachment of a stripped fiber using epoxy to a hardened ferrule. The fiber is mechanically-cleaved or laser-cleaved, and then the end of the fiber and ferrule are polished semi-manually, which can be tedious and expensive. To speed manufacturing it is desired to be able to use lasers, particularly an industrial $CO_2$ laser, to cleave and polish the optical fiber and ferrule. However, Applicants have found that using an industrialized $CO_2$ laser, at the intensity, pulse repetition, sweep speed, polarization etc. that would be useful to cleave and machine the optical fiber, can induce fractures in the ferrule. A need exists for a ferrule system that facilitates use of a high-powered laser to cleave and machine, without substantially damaging the ferrule.

SUMMARY

Technology disclosed herein includes compositions, elastic modulus of inorganic compositions, porosity of compositions, geometry of compositions, and processes of making and using the same for a ferrule that, in some embodiments, allows for laser machining without ferrule damage, while retaining good mechanical properties in the ferrule.

At least one embodiment relates to a ferrule including body that has at least two regions of differing thermal expansion, where thermal expansion strains and stresses are lessened by a low modulus layer in the body. In some embodiments, the body is glass or ceramic.

At least another embodiment relates to a ferrule including a glass and/or ceramic body that has an interior of low expansion glass, a low modulus inorganic strain isolation layer, and an exterior of higher expansion ceramic and/or glass.

At least another embodiment relates to a ferrule that is not damaged by laser interaction with an interior, low expansion material when an optical waveguide supported by the ferrule and ferrule surface are machined by the laser. Further, the ferrule, at the same time is mechanically reliable, meaning that the ferrule can be connected and disconnected many times in extreme environmental conditions.

Additional aspects of the technology disclosed herein include a rapid, automated process for manufacture of the ferrules, including laser sintering and/or bonding of low-expansion glass and/or glass-ceramic to a ferrule, such as a tough, durable zirconia ferrule.

Technology disclosed herein allows automated cleaving, polishing, and/or machining of optical fibers and/or ferrules for optical cables, which speeds manufacture of waveguide cable assemblies. In some embodiments, the low-elastic modulus inorganic layer allows construction of an optical waveguide ferrule with materials having widely different thermal expansion coefficients, at reduced stress. For example, the low modulus layer acts to decouple strains due to thermal expansion differences. In some embodiments, a silica core region, which can be laser-machined without fracture, may be contained within an outer shell of zirconia where effects of thermal-expansion-related stress are mitigated by strain (e.g., compression) of the lower modulus layer.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE FIGURES

The accompanying Figures are included to provide a further understanding, and are incorporated in and constitute a part of this specification. The drawings illustrate one or more embodiments, and together with the Detailed Description serve to explain principles and operations of the various embodiments. As such, the disclosure will become more fully understood from the following Detailed Description, taken in conjunction with the accompanying Figures, in which.

DETAILED DESCRIPTION

Before turning to the following Detailed Description and Figures, which illustrate exemplary embodiments in detail, it should be understood that the present disclosure is not limited to the details or methodology set forth in the Detailed Description or illustrated in the Figures. For example, as will be understood by those of ordinary skill in the art, features and attributes associated with embodiments shown in one of the Figures or described in the text relating to one of the embodiments may well be applied to other embodiments shown in another of the Figures or described elsewhere in the text.

Figure 1:
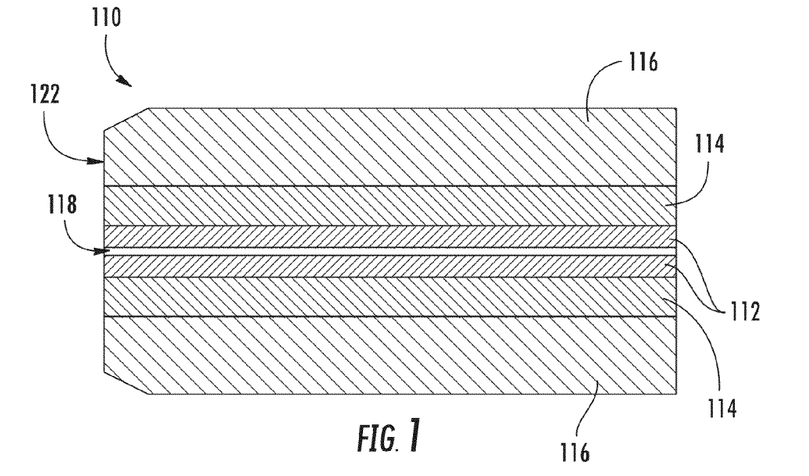
FIG. 1 is a schematic diagram of ferrule in cross-section according to an exemplary embodiment.
Figure 2:
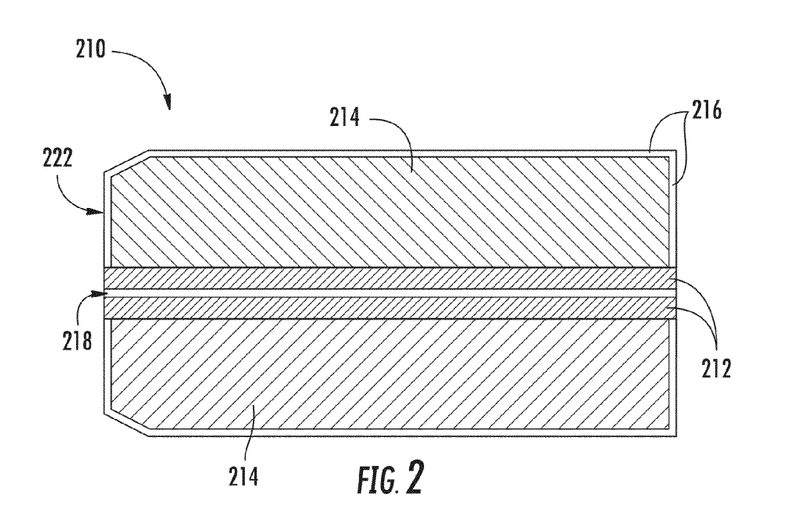
FIG. 2 is a schematic diagram of ferrule in cross-section according to another exemplary embodiment.

Technology disclosed herein relates to compositions, elastic moduli of inorganic compositions, porosity of compositions, geometry of compositions, and processes for making and using a ferrule 110, 210 that allow for laser-machining of the ferrule 110, 210, without ferrule damage, while retaining good mechanical properties in the ferrule 110, 210.

FIG. 1 includes a schematic of a ferrule 110 with a silica core 112 with a low-modulus layer 114 and a higher-modulus wear resistant exterior 116. FIG. 2 includes a schematic of a ferrule 210 with a silica core 212 with a low-modulus body 214 and a hermetic exterior 216.

Figure 13:
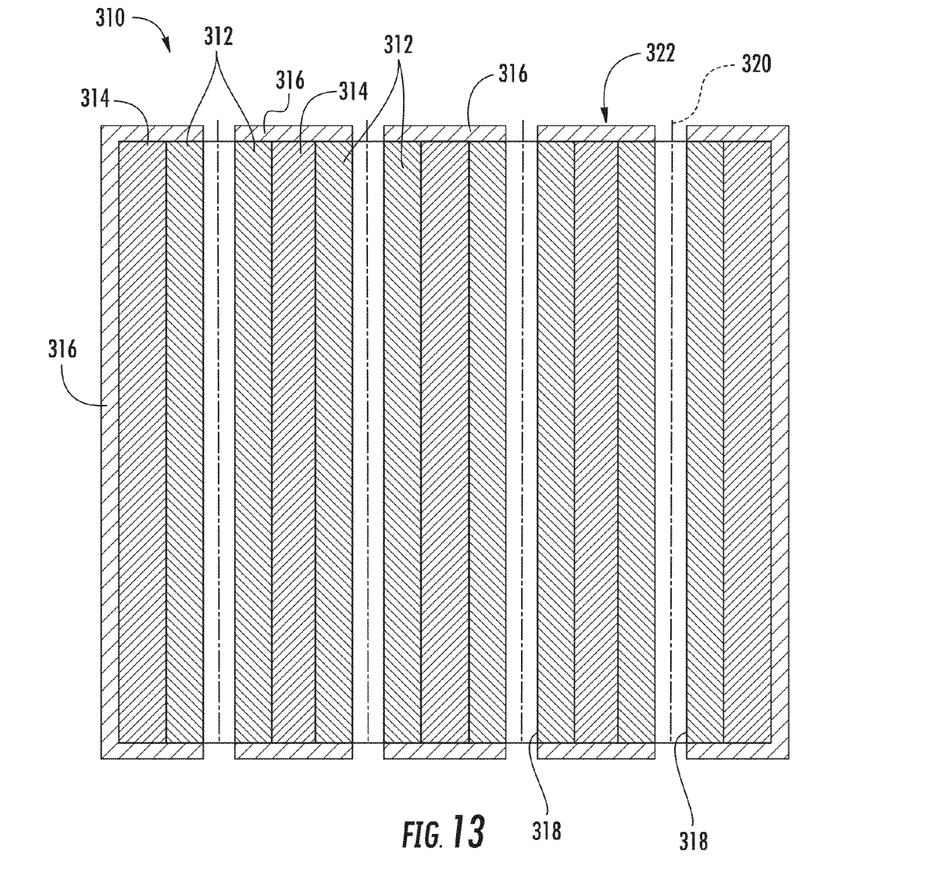
FIG. 13 is a schematic diagram of a multi-fiber ferrule in cross-section according to an exemplary embodiment.

Referring generally to FIGS. 1-2, the ferrule body 110, 210 has at least two regions of differing thermal expansion characteristics, where strains and stresses due to thermal expansion are mitigated by a low-elastic modulus layer 114, 214 in the body. In some such embodiments, a part-glass, part-ceramic body has an interior of low-expansion glass 112, 212 defining a bore 118, 218 of the ferrule 110, 210, a low-modulus inorganic strain-isolation layer 114, 214, and a hermetic exterior 116, 216 of higher-thermal-expansion ceramic and/or glass material. The ferrule 110, 210 is not damaged by laser interaction with the interior low-expansion material 112, 212 when an optical waveguide (see optical waveguide 320 as shown in FIG. 13) in the bore 118, 218 and the ferrule surface 122, 222 are being machined. At the same time the ferrule 110, 210 is mechanical reliable, meaning that the ferrule 110, 210 can be connected and disconnected many times in extreme environmental conditions. The technology disclosed herein allows rapid, automated machining and polishing of the ferrule 110, 210 and/or waveguide(s) for the manufacture of optical cables, cable assemblies, and connectorized fiber optic systems.

According to an exemplary embodiment, the interior 112, 212 of the ferrule 110, 210 (with a low-modulus region 114, 214) is a low-thermal-expansion material, preferably below $40 \times 10^{-7}/°C.$, more preferably below $30 \times 10^{-7}/°C.$ According to an exemplary embodiment, the interior 112, 212 of the ferrule 110, 210 preferably includes a boro-silicate or silica glass, more preferably a silica glass. In some embodiments, the ferrule 110, 210 is round in cross-section, and the interior of the ferrule 110, 210 is an annular tube 118, 218 with a diameter greater than 200 microns, but less than 2.3 mm, preferably a diameter greater than 300 microns but less than 1 mm, more preferably less than 600 microns.

According to an exemplary embodiment, the ferrule 110, 210 has an intermediate region or layer 114, 214 (e.g., stress-isolation zone) of material (e.g., inorganic material) with a Young's elastic modulus that is less than 90% that of the highest Young's elastic modulus of an adjacent region 112, 212 or 116, 216.

According to an exemplary embodiment, the outer region or layer 116, 216 of the ferrule 110, 210 includes a ceramic or ceramic plus glass. In some embodiments, ceramic of the outer region 116, 216 is preferably zirconia, more preferably tetragonal zirconia, with the ceramic being more than 40 volume-percentage of the composition of the outer region or layer 116, 216.

In some embodiments, the interior 112, 212 of the ferrule 110, 210 is a redrawn glass (e.g., silica) rod with an inner diameter hole (e.g., bore) of about 120-130 microns in diameter. According to an exemplary embodiment, the ferrule 110, 210 includes one end that is tapered from the outer diameter of the silica rod to the inner hole (not shown), to ease insertion of the optical fiber (e.g., forms a funnel to receive the fiber).

Referring to FIG. 1, the ferrule 110 structure with a low modulus layer 114 can simply be a three layer structure with the silica interior 112, a zirconia exterior 116, and a low-modulus layer 114 in-between. In some such embodiments, the ferrule 110 may further include a hermetic seal of glass, SiC(NO), SiC(NO)-precursor, or glass plus ceramic on the ends of the low-modulus layer 114 (see generally exterior 216 as shown in FIG. 2).

According to an exemplary embodiment, the low-modulus layer 114, 214 of the ferrule 110, 210 has a Young's elastic modulus less than 90% that of the highest Young's elastic modulus of an adjacent region 112, 212 or 116, 216, preferably less than 80%, even more preferably than 70% that of the highest Young's modulus of an adjacent region 112, 212 or 116, 216, whereby the low-modulus layer provides cushioning or stress isolation between adjoining regions or layers 114, 214 and either 112, 212 or 116, 216.

Generally speaking, the wider the low-modulus layer 114, 214, the more the thermal expansion strains are decoupled and the less stress in the body of the ferrule 110, 210. According to an exemplary embodiment, the interior 112, 212 of the ferrule 110, 210 is silica, the exterior 116, 216 is greater than 40 volume-percentage crystalline zirconia, and the intermediate low-modulus layer 114, 214 therebetween is greater than 20 microns thick (on average), preferably at least 100 microns. In other embodiments, the intermediate low-modulus layer 114, 214 is thinner than 20 microns.

According to an exemplary embodiment, the interior 112, 212 of the ferrule is a boro-silicate, the exterior 116, 216 is at least 40 volume-percentage crystalline zirconia, and there is an intermediate expansion grading or layer 114, 214 therebetween. The intermediate expansion grading or layer 114, 214 therebetween is greater than 20 microns thick (on average), preferably at least 100 microns. In other embodiments, the intermediate low-modulus layer 114, 214 is thinner than 20 microns.

In some embodiments, the exterior 116, 216 of the ferrule 110, 210 is at least 40 volume-percentage crystalline zirconia and the glass in the low-modulus layer 114, 214 includes a glass of (in mole-percentage) 59.08 $SiO_2$, 13.33 $B_2O_3$, 9.37 $Al_2O_3$, 8.03 $Na_2O$, 4.09 CaO, 1.28 $Li_2O$, 1.64 $K_2O$, 1.79 MgO, 1.37 $ZrO_2$ and crystalline ceramic in the low-modulus layer 114, 214 is zirconia.

In some embodiments, the grading or layer 114, 214 of the ferrule 110, 210 extends for more than 20 microns next to the interior low-expansion core 112, 212 and is comprised of 50 volume-percentage or more zirconia with a glass or glass-ceramic, including at least one of the families of Glass B and Glass C, where Glass B (mole-percentage) includes 60.0 $SiO_2$, 20.0 $Al_2O_3$, 20.0 ZnO and Glass C (mole %) includes 59.0 $SiO_2$, 19.6 $Al_2O_3$, 12.4 ZnO, 6.8 $Li_2O$, 2.2 $ZrO_2$.

According to an exemplary embodiment, the interior low-expansion core 112, 212 of the ferrule 110, 210 is round and at least 200 microns in outside diameter, with the core 112, 212 at least 300 microns in outside diameter being preferred. In some such embodiments, the crystalline ceramic in the exterior 116, 216 of the ferrule 110, 210 is zirconia, where a preferred zirconia is mainly tetragonal zirconia, and/or where the zirconia is doped with a rare earth oxide, Y, Ca, Mg, In, or Sc oxides and combinations thereof. In some embodiments, the zirconia may contain stabilizing dopant aids of oxides of Ti or Sn and toughening agents of oxides of Nb, Ta, W, and Mo. According to an exemplary embodiment, the exterior 116, 216 crystalline ceramic is zirconia with 3 mole % or less yttria.

Although some of the examples below use cold pressing as a shape forming method, there are a great variety of methods that can be used for forming the body 110, 210 with a lower modulus layer 114, 214. One of the more useful methods includes pressure-less sintering. To reduce the stresses developed by the thermal expansion difference, generally speaking—the lower the fabrication (sintering) temperature, the better. A process where the ferrules are sintered at less than 1100° C. is preferred, with less than 1000° C. being more preferred, and with less than 950° C. or even less than 850° C. being still more preferred, in some embodiments.

According to an exemplary embodiment, layered or graded structures 110, 210 with low-modulus regions 114, 214 may be formed directly from graded or layered powders. When sintering a pure silica core, for example, temperatures over 1400° C. may be used, which can cause de-vitrification issues with some composition combinations used for the intermediate layers. According, it may be preferred to sinter the ferrule 110, 210 around a pre-formed low expansion core rod 112, 212 with a central bore hole 118, 218 formed therein. This central core rod can 112, 212 be redrawn with an accurate central bore 118, 218, if the low expansion core 112, 212 is a glass. Applicants have found that silica and boro-silicates are particularly amenable to this re-draw process.

For ease of processing, the crystalline ceramic powders may be used in the form of agglomerates (often from a spray drying process), as shown in FIGS. 3-10. Applicants have found that, with some crystalline ceramic compositions, it is advisable to pre-sinter the agglomerates, particles, or grains to get the right grain size for the properties of interest. For instance pre-sintering zirconia agglomerates in greater than 1250° C. and less than 1700° C., preferably greater than 1300° C. and less than 1600° C., can give near spherical granules that are nearly pore free (with mostly tetragonal phase), where the grains size is large enough to allow some transformation to monoclinic zirconia, allowing the possibility of some transformation toughening.

For some embodiments, the low modulus pre-cursor layer can contain pore formers such as starches, graphite, carbon, polymers, etc. that burn, oxidize, melt, volatize, react, etc. leaving porosity. As such, the stress-isolation region 114, 214 of the ferrule 110, 210 for some embodiments is porous. According to an exemplary embodiment, the stress-isolation region 114, 214 has a void fraction, the ratio of free space (i.e., void volume) to total volume, of at least 3%. In some embodiments, the stress-isolation region 114, 214 has a void fraction of at least 5%, such as a void fraction of at least 10%. The voids facilitate compressibility and/or expansion of the stress-isolation layer 114, 214 to at least partially compensate for expansion and/or contraction adjoining layer(s) 112, 212 or 116, 216, such as during laser processing of the ferrule 110, 210 and/or components thereof, whereby the ferrule 110, 210 may undergo temperature and strain differentials without fracture.

Although some of the examples use cold pressing as a shape forming method, due to advantages thereof, a great variety of methods can be used for forming a graded or layered body 110, 210.

According to at least one exemplary embodiment, if the low expansion core 112, 212 cane is being made by redraw, there is the possibility of adding the low modulus 114, 214 and exterior 116, 216 layers or gradient by using coating cups, drying regions, and/or sintering regions on the end of the draw, in a manner similar to the way a protective polymer coating is applied to optical waveguides. There can be a coating cup and drying station for each layer; and if the layer composition can sinter rapidly, Applicants contemplate two or more coating stations with drying and sintering regions where the rod or cane of a ferrule is drawn through continuously.

According to an exemplary embodiment, extrusion is a very convenient shape-forming method for an elongate object 110, 210, which may have a constant cross-section. In some embodiments, ram extrusion, using a billet of material where the billet contains the composition gradient or the differing composition layers (see generally FIG. 3), can be used to form the complete unfired ferrule body (green body), with the low modulus layer 114, 214 or a graded- or layered-tube. A core rod 112, 212 of low expansion glass may also be used, preferably inserted prior to sintering.

According to some such exemplary embodiment, co-extrusion, using more than two feed streams, may be utilized and can give better results than the billet/ram extrusion process disclosed above. For example, the entire ferrule 110, 210 structure may be co-extruded or several layers may be co-extruded, with a dense core rod 112, 212 subsequently inserted. Tubes of various diameters and compositions can be extruded singly, assembled into layered and/or graded rods or tubes with the low-modulus precursor region. Applicants contemplate a pressing operation after assembly to ensure knitted interfaces.

According to some exemplary embodiments, cold pressing, uniaxial, dry bag quasi-iso-static, wet bag iso-static methods are used for manufacturing the ceramic components of a ferrule 110, 210 as disclosed herein. For a dry-wet bag or even a uniaxial pressing operation, Applicants contemplate a series of concentric funnels that can fill the bag or die simultaneously, and then having only one pressing operation for the ferrule 110, 210. As shown in the examples (below), powders can be pressed and sintered around a dense core rod 112, 212. Repeated pressing operations are contemplated with a new composition being built up around the interior body 112, 212 to create layers and gradients with low-modulus precursor regions.

Such pressing operations may be done around a dense core rod 112, 212, but need not be limited to concentric cylinders of differing compositions and/or thermal expansion coefficients. Assembly of a graded and/or layered tube 110, 210 with a low-modulus precursor region 114, 214 around a glass core (or cores) 112, 212 is possible with perhaps a second pressing operation to increase contact between the core 112, 212 and powder tube. According to an exemplary embodiment, tubes of various sizes (e.g., diameters) and compositions may be pressed singly (i.e., one at a time or separately), assembled into layered/graded rods or tubes with a low modulus pre-cursor region 114, 214. Applicants contemplate a pressing operation after assembly to ensure knitted interfaces.

According to another exemplary embodiment, electrostatic methods may be used for graded or layered rod configurations 110, 210 with low-modulus precursor regions 114, 214. Dry or wet powder may be electrically charged, strong thin gatherer wire filament may be oppositely charged, and/or a core cane/rod may be coated to make the core cane/rod slightly conductive, and layered or graded ferrule preform can be made. Hollow graded or layered tubes may be made and assembled around an interior glass core 112, 212. The core rod 112, 212 may be drawn continuously through different powder chambers or different powders may be introduced to a single chamber. In some embodiments, metallic pre-forms with a plethora of rod "gatherer" shapes can be used.

According to an exemplary embodiment, slip casting methods may be used for graded or layered rod configurations 110, 210 with low modulus precursor regions 114, 214. Powder may be dispersed in a fluid, usually via surfactants and suitable salt, acid, base adjustment to the carrier fluid, and the powder deposited in a porous mold. The layered or graded ferrule 110, 210 pre-form may be made by sequential removal then additions of fluids with differing powder compositions. In some such embodiments, a fluid can be delivered to the mold via a tube, with the composition of the fluid and powder in the tube varied with time. Hollow graded or layered tubes may be made and assembled around an interior glass core. Pressure slip casting can also be practiced with embodiments disclosed herein.

According to another exemplary embodiment, electrophoretic methods may be used for graded or layered rod configurations 110, 210 with low modulus precursor regions 114, 214. Powder can be electrically charged, usually via surfactants and suitable salt, acid, base adjustment to the carrier fluid, and the powder deposited on a strong thin gatherer wire filament oppositely charged, or a core cane/rod coated to make it slightly conductive, and a layered or graded ferrule 110, 210 pre form can be made. Hollow graded or layered tubes can be made and assembled around an interior glass core 112, 212. The core rod 112, 212 can be drawn continuously through different fluid chambers or different powders and/or fluids may be introduced to a single chamber. Metallic pre-forms with a plethora of rod "gatherer" shapes can be used according to some embodiments.

Some single composition ferrules 110, 210 are made by injection molding, sintering and machining. According to an exemplary embodiment, Applicants contemplate injection molding a core powder, then sequentially taking the part and putting it into larger and larger dies for incrementally injection molding more layers around the original core. To maintain the sample of the first core and layers, each succeeding layer may need a lower temperature carrier polymer.

In at least one embodiment, a pre-form body 110, 210 with porosity or with a porosity and composition gradient (and/or layers), as may be produced by some of the techniques disclosed herein, is infiltrated with glass. The infiltration may be driven by capillary forces or via use of an external pressure. In some embodiments, if the ferrule 110, 210 preform is covered with a gas impermeable glass, hot iso-static presses could be used for infiltration. By adjusting the viscosity, time, temperature, and/or pressure, only part of the exterior of the body 110, 210 may need to be infiltrated, thereby leaving a low modulus layer or region 114, 214 for stress isolation.

According to another embodiment, a combined technique of pull-trusion with either a billet or multiple feed die might be utilized. A strong core rod 112, 212, that may be somewhat flexible, could be mounted on a reel, with the reel put into a pressure vessel. The interior rod may be fed into a billet or multi-feed die/extrusion feed pressure chamber with a seal between the reel pressure chamber and the extrusion feed chamber. If the pressures in the two chambers are balanced, then the core rod 112, 212 may be pulled through an extrusion die while the layered or graded ferrule powder (with a low modulus precursor layer) is extruded onto it. A gas or hydraulic pressure could be feed into the reel pressure chamber, to prevent extrusion batch back flow.

According to still another embodiment, an extrusion method uses a carousel form to hold a core cane or inner core region 112, 212, and a tube of one layer 114, 214 is extruded onto the inner core or rod 112, 212. Upon heating and/or drying the outside tube or layer 114, 214 shrinks, and the part or even the entire carousel is moved to a second extruded component where another, larger layer 116, 216 can be extruded over the previous material. This sequence may be repeated until the final gradation number of layers is finished.

According to still another embodiment, layered and gradient composition ferrules 110, 210 with low modulus regions 114, 214 may be made by a repeated dipping method (conceptually similar to 17th century candle making). Using a thin "bait" fiber or a core rod 112, 212, repeated dipping into a molten slurry of powder and polymer can build up layers and gradients. To maintain the sample of the first core and layers 112, 212, each succeeding layer may have a lower temperature carrier polymer.

EXAMPLES

One zirconia composition was used and one glass, glass-ceramic composition was used. The zirconia was purchased from Tosoh Chemical Company, Japan and was TZ3Y, zirconia with 3 mole-percentage yttria. A medium magnitude of thermal expansion (e.g, $70 \times 10^{-7}/°$ C.$\pm 20 \times 10^{-7}$) expansion coefficient, low-temperature sintering glass, Glass A (mole-percentage): 59.08 $SiO_2$, 13.33 $B_2O_3$, 9.37 $Al_2O_3$, 8.03 $Na_2O$, 4.09 CaO, 1.28 $Li_2O$, 1.64 $K_2O$, 1.79 MgO, 1.37 $ZrO_2$ was used. Silica "rods," of about 350 to 400 microns in diameter and $5.5 \times 10^{-7}/°$ C. expansion coefficient, were also used. The silica "rods" where made by re-drawing a silica boule and may be made with an accurate inner diameter (bore) of roughly 126 microns.

As a guide for experimentation a simple semi-analytic stress model was developed for two- to five-layer configurations of infinite-length cylindrical elastic structures with the outer layer about 2.5 mm in diameter. The model focused on the circumferential (tensile) stress component and allowed for different thermal expansion coefficients, Young's elastic moduli, Poisson's ratios, and layer numbers and thicknesses. For the model, all the layers were assumed to be hollow cylinders except for the inner layer which was a solid cylinder, and all the cylinders were assumed concentric.

Example 1

Glass A was melted then ground and milled into powder, with the median powder particle size being between 3 to 7 microns.

Figure 3:
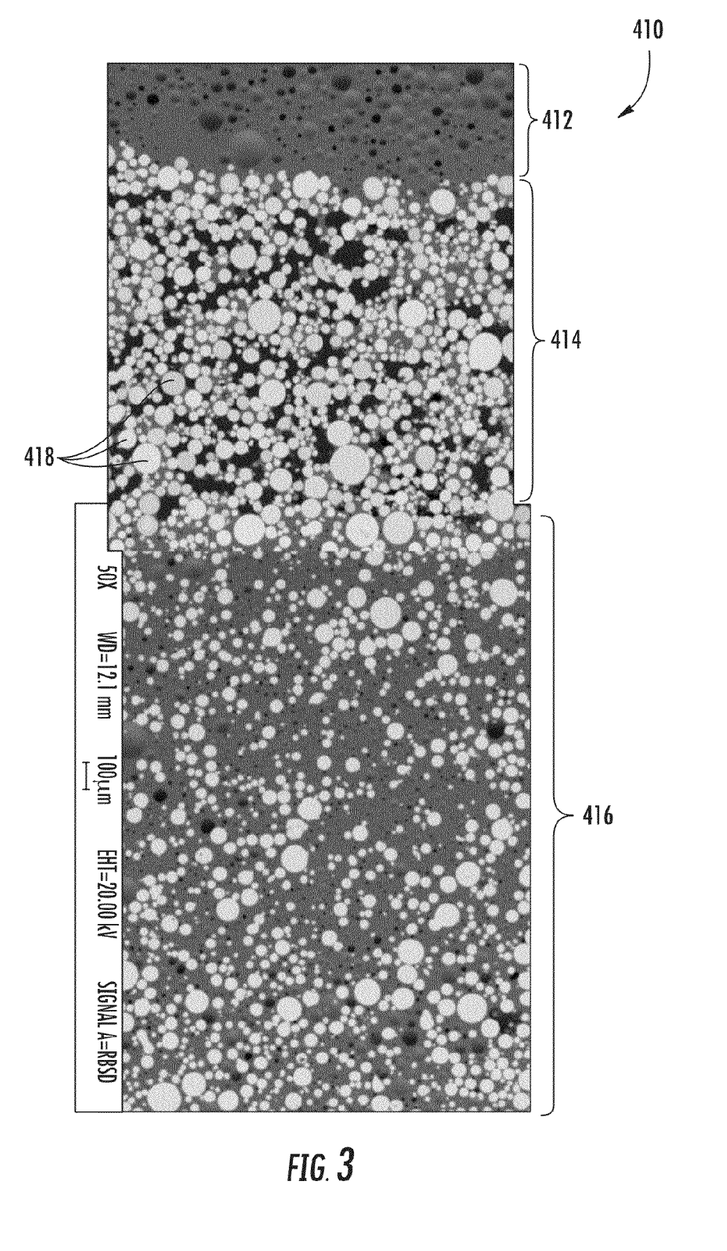
FIG. 3 is a scanning electron microscope (SEM) micrograph of four sintered layers with a low modulus region according to an exemplary embodiment.

Agglomerates 418 of zirconia 3 mole % yttria were pre-sintered at 1300° C. in air for 2 hours. Mixed compositions of zirconia 3 mole-percentage yttria pre-sintered agglomerates were mixed with 62.5 vol. %, 75 vol. %, and 7.5 vol. % Glass A. Thin layers of 100% Glass A, 7.5% Glass A, 75% Glass A, and 62.5% Glass A were spread in a steel bar die and uni-axially pressed. The bar pre-form was placed in a latex iso-pressing bag, the was air removed by a vacuum pump, and the was bag sealed. The bar was cold iso-statically pressed to about 25 kpsi. The pressed bar was placed on coarse alumina "setter" sand in an alumina sagger box and sintered at 800° C. in air for 4 hours. The bar was cut, polished and examined by SEM. FIG. 3 shows the cross-sectional structure, and more specifically FIG. 3 includes an SEM micrograph 410 of a low-modulus porous layer 414 of high-expansion between two layers 412, 416 of much lower expansion, higher-modulus, and density.

Example 2

Glass A was melted then ground and milled into powder, with the median powder particle size being between 3 to 7 microns.

Figure 4:
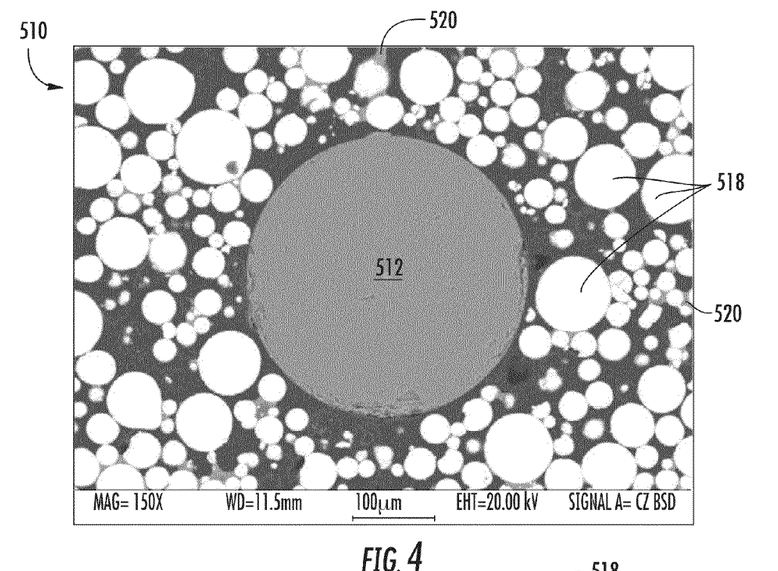
FIGS. 4-6 are SEM micrographs of a silica, zirconia, and glass microstructures of a ferrule body according to an exemplary embodiment
Figure 5:
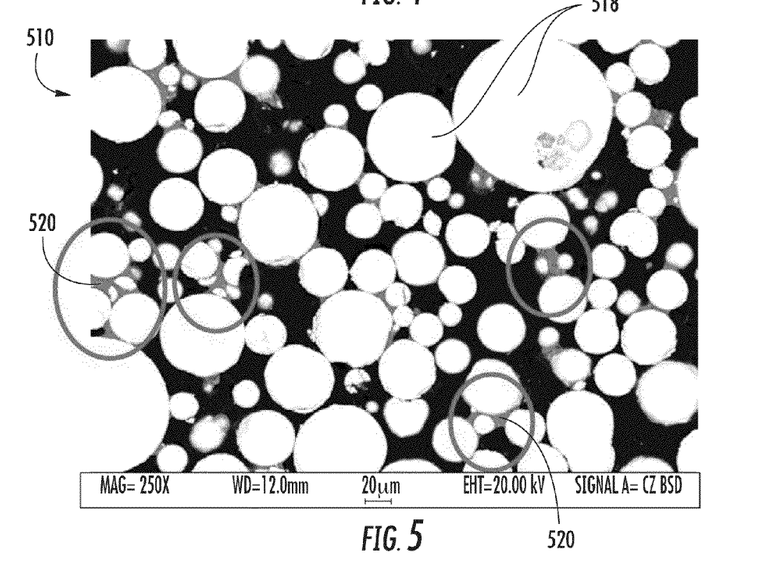
Figure 6:
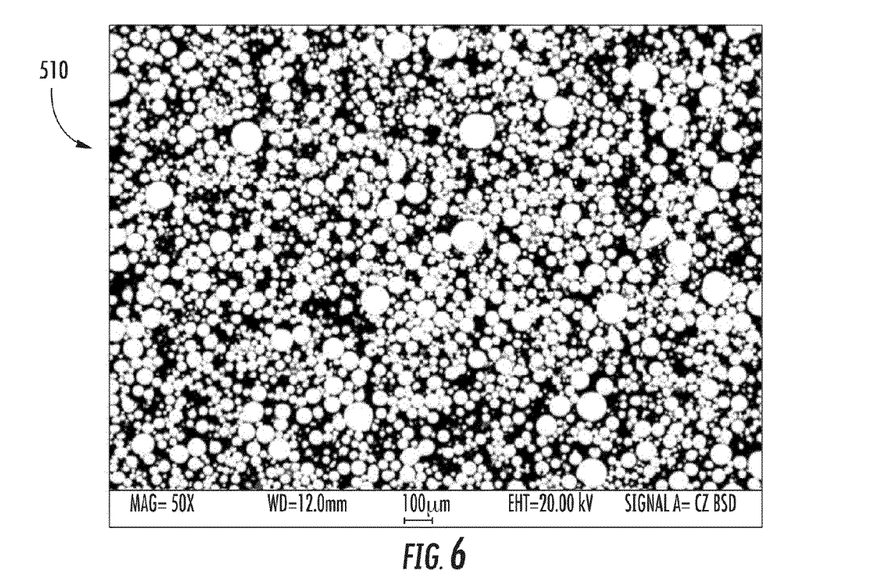

Agglomerates 518 of zirconia 3 mole-percentage yttria where pre-sintered at 1300 C in air for 2 hours. Agglomerates of 92.5 vol. % zirconia 3 mole % yttria pre-sintered were mixed with 7.5 vol. % Glass A. Layers of the mixed powder were spread in a steel bar die, a silica rod 512 was put in the middle of the layers and uni-axially pressed. The bar pre-form was placed in a latex iso-pressing bag, the air removed by a vacuum pump and the bag was sealed. The bar was cold iso-statically pressed to about 25 kpsi. The pressed bar was placed on coarse alumina "setter" sand in an alumina sagger box and sintered at 900° C. in air for 4 hours. The bar was cut, polished, and examined by SEM. FIGS. 4-6 are representative of the resulting cross-section structure, with the bar intact. More specifically, FIG. 4 includes a silica core rod 512 sintered in a low-modulus zirconia 518 and glass material 520 with high expansion characteristics, where no thermal expansion by delta-temperature mismatch fracture occurred around the silica core 512. FIG. 5 includes a glass and zirconia microstructure, where glass 520 bridges between some pre-sintered zirconia agglomerates 518 are encircled. FIG. 6 includes a low-magnification SEM micrograph of a zirconia and glass body 510 having extensive porosity.

Example 3

Glass A was melted then ground and milled into powder, with the median powder particle size being between 3 to 7 microns.

Figure 7:
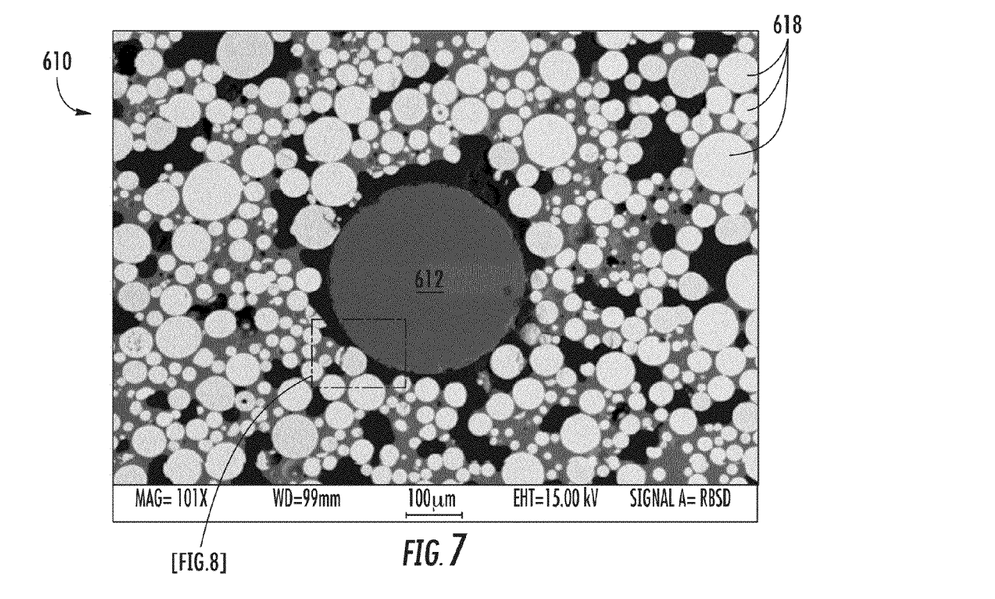
FIGS. 7-8 are SEM micrographs of a silica core sintered in a low modulus material including glass and zirconia according to an exemplary embodiment.
Figure 8:
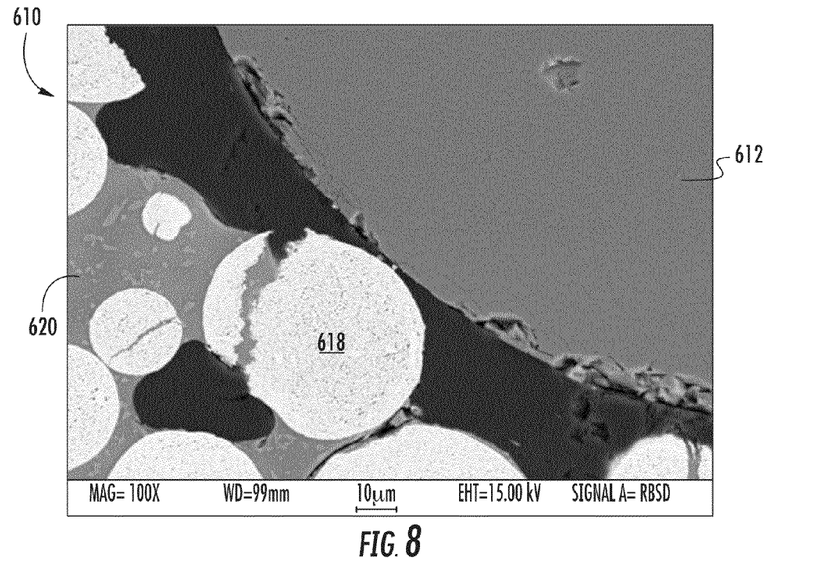

Agglomerates 618 of zirconia—3 mole % yttria where pre sintered at 1300° C. in air for 2 hours. Pre-sintered agglomerates of zirconia—3 mole % yttria where mixed with 40% Glass A. Layers of the mixed powder were spread in a steel bar die, a silica rod 612 put in the middle of the layers and uni-axially pressed. The bar pre-form was placed in a latex iso-pressing bag, the air removed by a vacuum pump and the bag sealed. The bar was cold iso-statically pressed to about 25 kpsi. The pressed bar was placed on coarse alumina "setter" sand in an alumina sagger box and sintered at 700° C., 800° C. or 1000° C. in air for 4 hours, most likely 800° C. The bar was cut, polished, and examined by SEM. FIGS. 7-8 are representative of the resulting cross-section structure, with the bar intact. As seen, there is no de-vitrification or fracture in the silica core 612 and no thermal expansion difference causing change in temperature stress fractures in the zirconia—glass ceramic body 610. More specifically, FIG. 7 shows a silica core rod 612 sintered in a second low-modulus zirconia 618 and glass 620 material with high-expansion, where no fracture occurred in the low-modulus body due to thermal expansion mismatch by delta temperature fracture around the silica core 612. FIG. 8 shows glass 620 and zirconia 618 microstructure and the silica core 612 interface, with glass 620 bridges between some zirconia agglomerates.

Example 4

Glass A was melted then ground and milled into powder, with the median powder particle size being between 3 to 7 microns.

Figure 9:
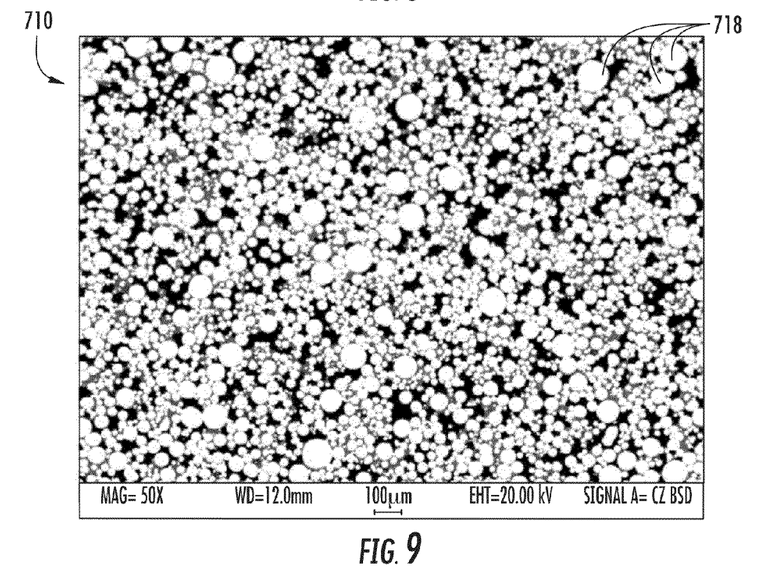
FIGS. 9-10 are SEM micrographs of a low-modulus material of a layer in a body of a ferrule according to an exemplary embodiment.
Figure 10:
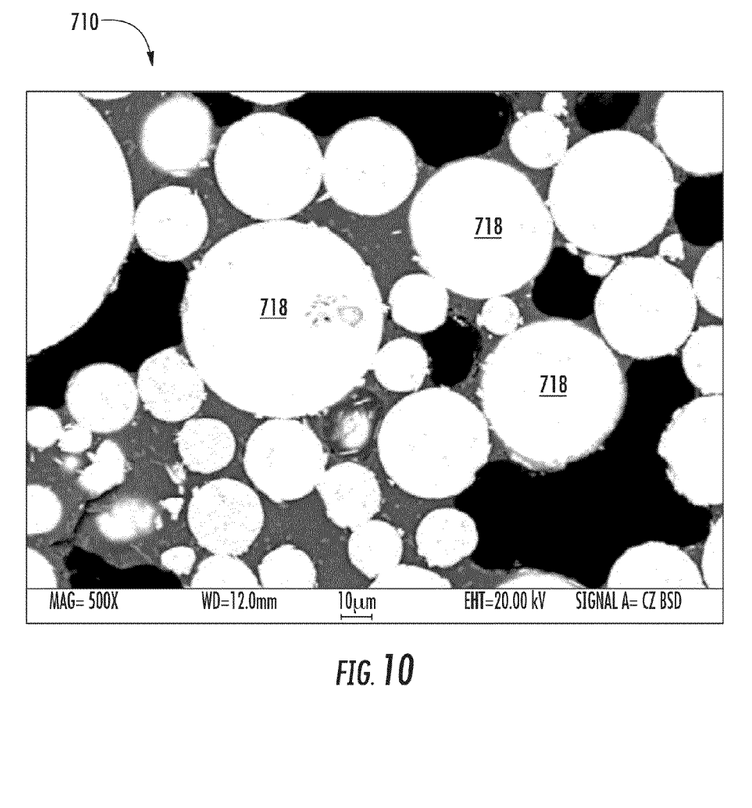

Agglomerates 718 of zirconia—3 mole % yttria where pre sintered at 1300 C in air for 2 hours. Agglomerates of 75 vol. % zirconia—3 mole % yttria pre-sintered were mixed with 25 vol. % Glass A. The mixed powder was spread in a steel bar die and uni-axially pressed. The bar pre-form was placed in a latex iso-pressing bag, the air removed by a vacuum pump and the bag sealed. The bar was cold iso-statically pressed to about 25 kpsi. The pressed bar was placed on coarse alumina "setter" sand in an alumina sagger box and sintered at 900° C. in air for 4 hours. The bar was cut and polished and examined by SEM. FIG. 9-10 show the microstructure of this low elastic modulus body 710, and more-specifically the FIGS. 9-10 show SEM microstructure of a low-modulus material 718 useful for a stress-isolation layer or region of body 710 (see also layers 114, 214 as shown in FIGS. 1-2) at least in part due to the high-degree of porosity.

Example 5

Glass A was melted then ground and milled into powder, with the median powder particle size being between 3 to 7 microns.

Agglomerates of zirconia—3 mole % yttria where pre-sintered at 1300° C. in air for 2 hours. Agglomerates of 92.5 vol. % zirconia—3 mole % yttria pre sintered were mixed 7.5 vol. % Glass A. The mixed powder was spread in a steel die and uni-axially pressed. The bar pre-form was placed in a latex iso-pressing bag, the air removed by a vacuum pump and the bag sealed. The bar was cold iso-statically pressed to about 25 Kpsi. The pressed bar was placed on coarse alumina "setter" sand in an alumina sagger box and sintered at 800° C. or 900° C. in air for 4 hours. Additional Glass A powder was sprinkled on the surface of the low modulus porous sintered bar, then the bar heated and sintered at 800° C. or 900° C. in air for 4 hours. The bar was cut and examined by optical microscopy. The glass had infiltrated the porous bar somewhat, but not fully, and there was a hermetic glass—ceramic layer on the exterior of the low modulus bar.

Example 6

Figure 11:
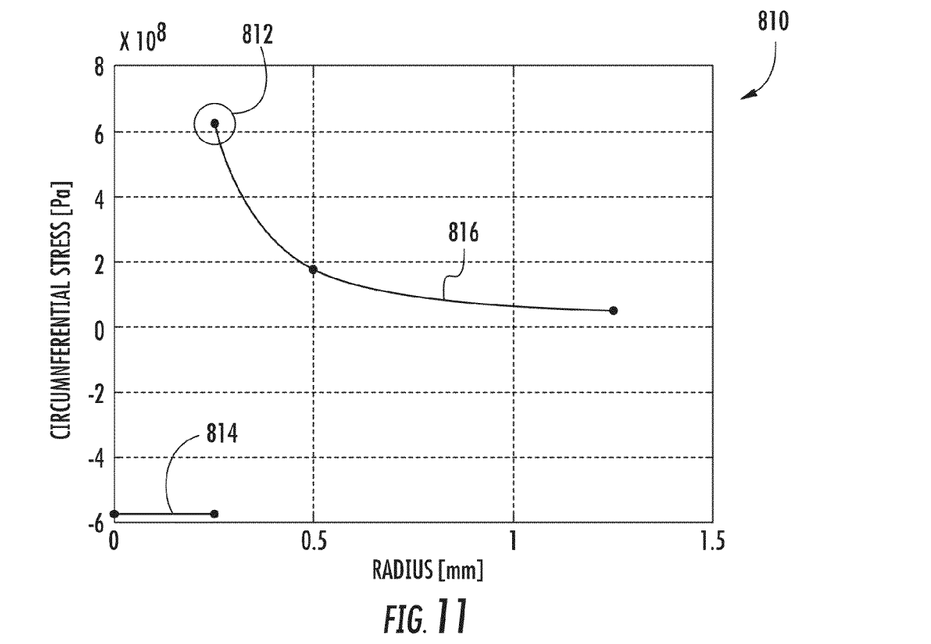
FIG. 11 is a plot of stress with respect to distance from the center for a two-part ferrule having a silica core and a zirconia and glass material exterior thereto.

Circumferential stresses in a two-layer body, assumed to be stress free at 800° C. and cooled to room temperature of about 20° C., were calculated. The thermal expansion coefficients, Poisson's ratio, Young's elastic moduli, and outer radii of the two layers used for the calculation are listed in Table I below. The values of layer 1 (814) are characteristic of silica and that of layer 2 (816), an approximately 90 volume-percentage zirconia and glass combination. FIG. 11 shows the resulting circumferential tensile stress being very high, approximately 610 MPa at the zirconia and glass/silica interface 812. More specifically, FIG. 11 includes a graph 810 of estimated stresses for a two-layer ferrule with a silica core 814 to a radius of 0.25 min and exterior 816 of approximately 90% zirconia and glass material to a radius of 1.25 mm, sintered at 800° C.

TABLE I

| Layer # | Young's elastic modulus GPa | Poisson's ratio | Thermal expansion/° C. | Layer outer radii mm |
| --- | --- | --- | --- | --- |
| 1 | 72.9 | 0.14 | $5.5 \times 10^{-7}$ | 0.25 |
| 2 | 200 | 0.31 | $10.5 \times 10^{-6}$ | 1.25 |

Example 7

Figure 12:
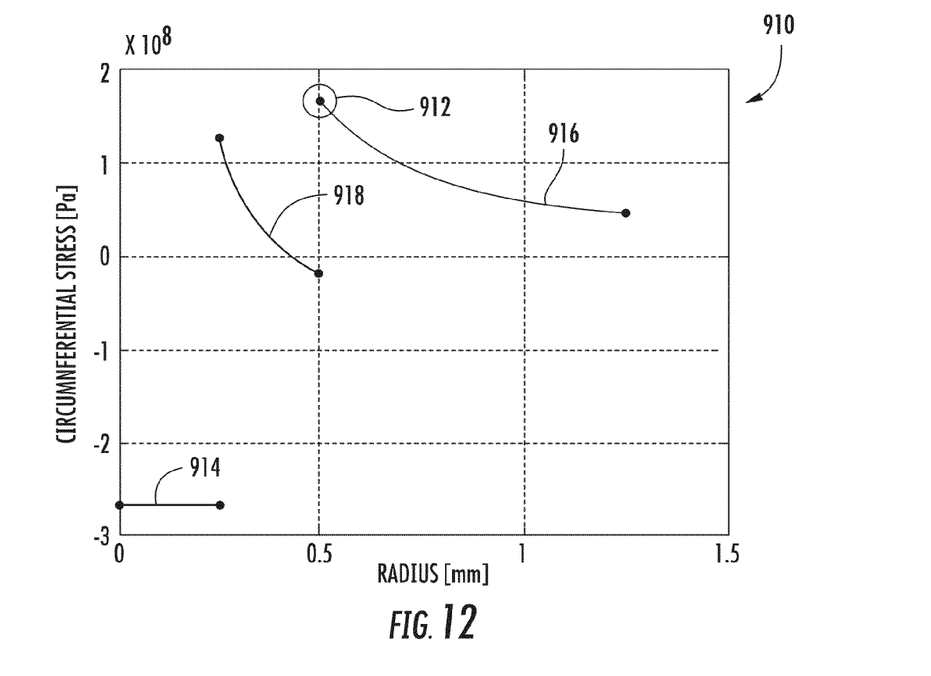
FIG. 12 is a plot of stress with respect to distance from the center for a three-part ferrule having a silica core, a low-modulus layer, and then the zirconia and glass material exterior thereto

Circumferential stresses in a three-layer body, assumed to be stress free at 800° C. and cooled to room temperature, were calculated. The thermal expansion coefficients, Poisson's ratio, Young's elastic moduli, and outer radii of the three layers used for the calculation are listed in table II. The values of layer 1 (914) are characteristic of silica, values of layer 2 (918) are characteristic of a low-elastic modulus region (approximately 50% the modulus of silica), values of layer 3 (916) are characteristic of an approximately 90 volume-percentage zirconia and glass combination. FIG. 12 shows the resulting circumferential tensile stress being much lower than that of Example 6: approximately 170 MPa at the zirconia 916 and glass/low modulus layer 918 interface 912. More specifically, FIG. 12 includes a graph 910 of estimated stresses for a three-layer ferrule with a silica core 914 to a radius of 0.25 mm, a low-modulus layer 918 to a radius of 0.5 mm (with the same expansion and Poisson's ratio as the third layer 916), and a third layer 916 of high modulus, of approximately 90% zirconia and glass material, to a radius of 1.25 mm, sintered at 800° C.

TABLE II

| Layer # | Young's elastic modulus GPa | Poisson's ratio | Thermal expansion/° C. | Layer outer radii mm |
|---|---|---|---|---|
| 1 | 72.9 | 0.14 | $5.5 \times 10^{-7}$ | 0.25 |
| 2 | 30 | 0.31 | $10.5 \times 10^{-6}$ | 0.5 |
| 3 | 200 | 0.31 | $10.5 \times 10^{-6}$ | 1.25 |

Example 8

To provide understanding regarding the usefulness of lower modulus interior layers, near the elastic modulus of the exterior layers, three more calculations were performed. The thermal expansion coefficients, Poisson's ratios, and outer radii of the three layers used for the calculation are listed in Table III. The three-layer body was assumed to be stress free at 800° C. and cooled to room temperature. The Young's modulus values of the interior lower modulus layer were varied from 90% to 66.66% of that of the outer layer.

Table III shows the maximum circumferential tensile stress that where calculated. This calculation shows the value of even small decreases in elastic modulus. The inventors believe that a decrease in the elastic modulus to only 90% of the highest elastic modulus of an adjacent layer, still gives a benefit in reducing the maximum stress, although a small one. However, a more substantial drop in the elastic modulus to 75% of that of the highest elastic modulus of an adjacent layer offers a substantial benefit in reduction of maximum stress.

TABLE III

| Calculation # | Young's elastic modulus GPa | % of Example 6 elastic modulus | Poisson's ratio | Thermal expansion/ ° C. | Layer outer radii mm | Max stress MPa |
|---|---|---|---|---|---|---|
| alpha | 120 | 66.66 | 0.31 | $10.5 \times 10^{-6}$ | 0.5 | 450 |
| beta | 150 | 75 | 0.31 | $10.5 \times 10^{-6}$ | 0.5 | 510 |
| gamma | 180 | 90 | 0.31 | $10.5 \times 10^{-6}$ | 0.5 | 590 |
| Example 6 | 200 | 100 | 0.31 | $10.5 \times 10^{-6}$ | 0.5 | 610 |

Referring now to FIG. 13, in some embodiments a multi-fiber ferrule 310 is manufactured and used according to the above disclosure. Accordingly, in some such embodiments, the multi-fiber ferrule 310 includes a low-expansion material 312 (e.g., glass) coupled to an interior thereof and having a bore(s) 318 defined therein, a higher-expansion material 316 (e.g., zirconia) on the exterior of the ferrule 310, and a stress-isolation region 314 (e.g., layer) therebetween. The interior may include more than one bore 318 to receive optical fibers 320, where the low-expansion material 312 may be connected or separated into isolated bore-forming tubes via stress-isolation regions 314.

As shown in FIG. 13, each bore 318 supports an optical fiber 320, where the bore 318 is formed in a first material 312 (e.g., glass). The first material 312 is surrounded by a second material 314 (e.g., porous inorganic material), which is itself surrounded by a third material 316 (e.g., typical zirconia ferrule materials). The second material 314 may provide a stress-isolation region having higher porosity and/or lower elastic modulus relative to the first and third materials 312, 316, as further disclosed above with regard to other embodiments. The multi-fiber ferrule 310 may support two, four, eight, twelve, sixteen, twenty-four, thirty-two, or other numbers of optical fibers 320. In some embodiments, the multi-fiber ferrule 310 is rectilinear, and the end face 322 is generally rectangular.

The construction and arrangements of the ferrule systems and processes, as shown in the various exemplary embodiments, are illustrative only. Although only a few embodiments have been described in detail in this disclosure, many modifications are possible (e.g., variations in sizes, dimensions, structures, shapes, and proportions of the various elements, values of parameters, mounting arrangements, use of materials, colors, orientations) without materially departing from the novel teachings and advantages of the subject matter described herein. For example, the term "include," and its variations, such as "including," as used herein, in the alternative, means "comprising," "primarily consisting of," "consisting essentially of," and/or "consisting of," where possible in the particular usage herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present inventive technology.

What is claimed is:

1. A ferrule for optical waveguides, comprising:
an exterior of the ferrule;
an interior of the ferrule having a bore defined therein configured to receive an optical waveguide; and
a stress-isolation region between the interior of the ferrule and the exterior of the ferrule, wherein material of the stress-isolation region has an elastic modulus that is less than the elastic modulus of material of the interior and exterior of the ferrule, whereby the stress-isolation region limits communication of stresses therebetween;
wherein:
the stress-isolation region is porous;
the stress-isolation region has an average void fraction of at least 3%; and
the stress-isolation region has a pore gradient such that the porosity increases as a function of distance from one location in the stress-isolation region to another.

2. The ferrule of claim 1, wherein the stress-isolation region has an average void fraction of at least 10%.

3. The ferrule of claim 1, wherein the interior and exterior of the ferrule are not porous.

4. The ferrule of claim 3, wherein the interior and exterior of the ferrule are hermetic.

5. The ferrule of claim 4, wherein the stress-isolation region is a layer, and wherein the layer extends between the interior and exterior of the ferrule and around the bore.

6. The ferrule of claim 5, wherein the layer is annular in cross-section, and wherein the layer is greater than 20 microns in thickness between the interior and exterior of the ferrule.

7. The ferrule of claim 1, wherein the elastic modulus of the stress-isolation region is less than 90% of the modulus of the exterior of the ferrule and less than 90% of the modulus of the interior of the ferrule.

8. The ferrule of claim 7, wherein the elastic modulus of the stress-isolation region is less than 70% the modulus of the exterior of the ferrule and less than 70% of the modulus of the interior of the ferrule.

9. The ferrule of claim 1, wherein the interior of the ferrule comprises a glass or glass ceramic.

10. The ferrule of claim 9, wherein the interior of the ferrule comprises glass tube having a bore formed therein and an outer diameter of at least 200 microns.

11. The ferrule of claim 9, wherein the exterior of the ferrule comprises a glass.

12. The ferrule of claim 9, wherein the exterior of the ferrule comprises at least one of SiCON and a precursor thereof.

13. The ferrule of claim 9, wherein the exterior comprises at least 40 percent by volume crystalline zirconia, and wherein the zirconia is mostly tetragonal.

14. The ferrule of claim 9, wherein the exterior comprises at least 40 percent by volume crystalline zirconia, and wherein the exterior further comprises at least one of a rare earth dopant, Y, Ca, Mg, In, and Sc.

15. The ferrule of claim 14, wherein the exterior further comprises at least one of $TiO_2$, $SnO_2$, $Nb_2O_5$, $Ta_2O_5$, $WO_3$, and $MoO_3$.

16. The ferrule of claim 1, wherein the interior of the ferrule comprises at least one of silica and boro-silicate, wherein the exterior comprises at least 40 percent by volume crystalline zirconia, and wherein the stress-isolation region comprises a layer of greater than 20 microns in thickness between the interior and exterior of the ferrule.

17. The ferrule of claim 16, wherein the interior of the ferrule comprises glass, in mole percentage, of 59.08 $SiO_2$, 13.33 $B_2O_3$, 9.37 $Al_2O_3$, 8.03 $Na_2O$, 4.09 $CaO$, 1.28 $Li_2O$, 1.64 $K_2O$, 1.79 $MgO$, 1.37 $ZrO_2$.

* * * * *